INVENTORS:
ABDUL G. DADA
WILLIAM R. DE HOLLANDER

BY: *Sam Laub*
ATTORNEY

United States Patent Office 3,796,672
Patented Mar. 12, 1974

3,796,672
PROCESS FOR PRODUCING URANIUM DIOXIDE RICH COMPOSITIONS FROM URANIUM HEXAFLUORIDE
Abdul G. Dada and William R. De Hollander, San Jose, Calif., assignors to General Electric Company
Filed Oct. 2, 1970, Ser. No. 77,446
Int. Cl. G21c 19/42
U.S. Cl. 252—301.1 R                    26 Claims

ABSTRACT OF THE DISCLOSURE

Conversion of gaseous uranium hexafluoride to a uranium dioxide rich composition in the presence of an active flame in a reaction zone is achieved by introducing a gaseous reactant comprising a reducing gas and a gaseous reactant comprising a mixture of uranium hexafluoride and an oxygen-containing carrier gas, the reactants being separated by a shielding gas as introduced to the reaction zone. The shielding gas temporarily separates the gaseous reactants and temporarily prevents substantial mixing and reacting of the gaseous reactants.

DESCRIPTION OF THE PRIOR ART

Uranium oxides have various utilities in the nuclear industry. Uranium dioxide is utilized in the nuclear industry as a fuel for nuclear reactors. In nuclear applications, uranium dioxide must have a low impurity content, a degree of enrichment with the $U^{235}$ isotope and a given density range. The enrichment of uranium customarily takes place through use of the compound uranium hexafluoride so that a process is required for converting uranium hexafluoride into uranium dioxide in a form which can be readily fabricated to shaped bodies having a low fluoride content.

One current practice for converting uranium hexafluoride to uranium oxide employs hydrolysis of uranium hexafluoride to give a solution of uranyl fluoride and hydrogen fluoride from which ammonium diuranate is precipitated by the addition of ammonia. After filtration the ammonium diuranate, which has a high fluoride ion content, is dissolved in nitric acid and fluoride decontamination of the resulting uranyl nitrate solution is accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride and an oxygen-containing atmosphere. One such method proposed in U.S. Pat. No. 3,235,327 teaches the reaction of uranium hexafluoride with steam at a temperature of at least 130° C. in the presence of a gas inert to this conversion. This reaction produces uranyl fluoride in powder form having a surface area in the range of 3 to 12 square meters per gram. The uranyl fluoride powder is subsequently converted to uranium dioxide using hydrogen and steam at a temperature of 550 to 600° C. This method has the disadvantage of requiring a two chamber reactor.

Another process presented in U.S. Pat. No. 3,179,491 yields uranium dioxide by intimately and homogeneously mixing gaseous uranium hexafluoride with steam and at least one reducing gas selected from hydrogen, ammonia and carbon monoxide. This method involves the development of a rapid spiral movement of the reacting gases which is achieved by introducing the reacting gases through converging gas inlet pipes directed into a vertical reactor. This method has inherent limits on the rate of production of uranium dioxide.

In Japanese patent publication No. 10,095 of 1966, another method is presented which uses three separate concentric tubes to feed into a reaction chamber (1) a gaseous uranium hexafluoride, hydrogen and oxygen mixture in one tube, (2) hydrogen in a second tube and (3) oxygen in the third tube. The chamber is filled with hydrogen and the incoming gases react in a flame started by an igniter. Since hydrogen and oxygen are mixed in the same tube with the uranium hexafluoride, the uranium hexafluoride is converted to uranium oxide when it first comes in contact with flame. The flame shown in the drawing of this publication occurs at the end of the concentric tubes feeding the gases into the chamber. Experiments have shown that this can involve the build-up of deposits on the ends of the concentric tubes resulting in plugging which interrupts the process. The process is thus discontinuous in that periodic removal of these deposits is required before further reaction can proceed.

In summary, the current practices for gas phase reaction of uranium hexafluoride to uranium dioxide are not satisfactory, in that they are not dependable, continuous, low cost processes. These gas phase processes therefore have not to date replaced the involved, expensive ammonium diuranate process discussed above.

SUMMARY OF THE INVENTION

The foregoing disadvantages of the prior art of producing uranium oxide by gas phase reaction of uranium hexafluoride are overcome by the present invention using a gas phase reaction sequence. The conversion occurs in a reaction zone having a reducing atmosphere into which the uranium hexafluoride is introduced as a gaseous mixture with an oxygen-containing carrier gas while the mixture is temporarily surrounded with a shielding gas. The conversion of the uranium hexafluoride to a uranium dioxide rich composition in the reducing atmosphere produces a flame in the reaction zone which burns at a position displaced, or lifted away, from the inlet used to introduce the gaseous mixture into the reaction zone. By this practice, there is no build-up of solid products or condensation of water vapor at the tip of the inlet used to introduce the gaseous mixture to the reaction zone so there is no interruption of the process.

It is an object of this invention to achieve a continuous gas phase reaction for converting uranium hexafluoride to a uranium dioxide rich composition which will not involve the build-up of reaction products on the tip of the inlet used to introduce the reactants into the reaction zone.

Another object of this invention is to provide an improved continuous gas phase process for converting uranium hexafluoride to a uranium dioxide rich composition in a reducing gas in a reaction zone.

It is another object of this invention to surround a mixture of uranium hexafluoride and an oxygen-containing carrier gas with a shielding gas as it is introduced into the reaction zone containing a reducing gas.

Still another object of this invention is to provide a process for converting uranium hexafluoride to a uranium dioxide rich composition in which the reaction flame burns at a position displaced, or lifted away, from the inlet used to introduce the uranium hexafluoride to the reaction zone.

A still further object of this invention is to control the uranium dioxide particle size by controlling the temperature of the flame used in the conversion of uranium hexafluoride, a lower temperature generally giving a finer product and a higher temperature generally giving a coarser product.

Still another object of this invention is to control the particle size of the resulting uranium dioxide from the flame conversion reaction by controlling the reaction pressure, with a higher pressure giving a coarser particle size and a lower pressure giving a finer particle size.

Still another object of this invention is to control the amount of fluoride ion content of the uranium dioxide rich composition by controlling the pressure at which the reaction takes place, with a higher pressure giving higher fluoride ion content and a lower pressure giving a lower fluoride ion content.

A still further object of this invention is to control the ceramic properties of the uranium dioxide produced in the practice of this invention by controlling the ratio of reducing gas to uranium hexafluoride, with higher ratios governed primarily by the economies of reducing gas consumption.

Still another object of this invention is to control the recovery of the fluoride ions as a by-product of hydrofluoric acid of desired concentrations by controlling the ratio of oxygen to uranium hexafluoride during the conversion of uranium hexafluoride.

Still another object of this invention is to condense the gas stream resulting from the conversion reaction of uranium hexafluoride to a uranium dioxide rich composition to give an aqueous hydrofluoric acid by-product of commercial quality.

Other objects and advantages of this invention will become apparent to a person skilled in the art from a reading of the following description of the invention and the appended claims and by reference to the accompanying drawings.

DETAILED DESCRIPTION OF THE INVENTION

The foregoing objects have been accomplished in a new process for thermal conversion of gaseous uranium hexafluoride to a uranium dioxide rich composition in the presence of an autogenous flame in a reaction zone which separately receives a mixture of uranium hexafluoride and an oxygen-containing carrier gas as a first gaseous reactant, a reducing atmosphere as a second gaseous reactant, and a shielding gas temporarily separating the first and second gaseous reactants from one another and temporarily preventing substantial mixing and reaction of the gaseous reactants. The shielding gas temporarily prevents the reducing gas from diffusing into the uranium hexafluoride-carrier gas mixtures and also prevents diffusion by the uranium hexafluoride-carrier gas mixture into the reducing gas until the mixture has moved away from the inlet through which the gases are introduced into the reaction zone. After a brief delay, sufficient cross diffusion of the gaseous reactants through the shielding gas occurs and the flame reaction occurs between the uranium hexafluoride, the carrier gas and the reducing atmosphere.

It has been discovered that one of the vexing causes of the failure of the prior art processes for continuous thermal conversion of uranium hexafluoride has been the build-up of reaction products, largely solid uranium oxides, at the gaseous uranium hexafluoride inlet to the reaction zone, apparently due to contact of the reaction flame with the inlet to the reaction zone. The process of the instant invention departs from the prior art in that a flow of shielding gas is employed to separate temporarily the first and second gaseous reactants after they have been introduced into the reaction zone. In this manner the first and second gaseous reactants do not react with each other until the gases have mixed sufficiently with each other by diffusing through the shielding gas. This provides a delay to the initiation of the conversion reaction with the result that the conversion flame is displaced and maintained away from the inlet to the reaction zone and the formation of plugging deposits is avoided.

The start-up of the process of the present invention may be accomplished in several ways.

One preferred sequence is as follows. First a reducing atmosphere is established in a reaction zone by a continuous flow of a reducing gas. Preferably, the reaction zone is preheated to a temperature of at least about 100° C. Second, an ignition means in the reaction zone is operated to insure ignition. Third, a flow of a mixture of the reactants of uranium hexafluoride and an oxygen-containing carrier gas into the reaction zone is begun, with the mixture being surrounded by a flowing layer of a shielding gas. Alternatively, the third step can be practiced with introduction of the oxygen-containing carrier gas and then introduction of the uranium hexafluoride so that it forms a mixture with the oxygen-containing carrier gas. As previously stated the layer of shielding gas serves to delay the diffusion of the reactants into each other. In the process of this invention, the shielding gas can be a gas non-reactive with the reactants of this process, and includes nitrogen, argon, helium, neon, krypton, xenon and mixtures thereof. The shielding gas also can be one which enters into the reaction, such as air, oxygen or a mixture of air and oxygen or a mixture of air, oxygen or air and oxygen with any of the foregoing non-reactive gases. The oxygen-containing carrier gas is selected from the group consisting of air, oxygen and mixtures thereof. The reducing gas is selected from the group consisting of hydrogen, dissociated ammonia and mixtures thereof.

Another preferred start-up sequence is as follows. First, the oxygen-containing carrier gas flows into the reaction zone. Second, the flow of shielding gas is started. Third, after a short delay, the reducing gas flow is started with operation of the igniter to produce a flame. Fourth, the flow of uranium hexafluoride is begun.

The present invention is based on the following apparent overall reduction-hydrolysis reaction in the presence of an active flame:

(1)
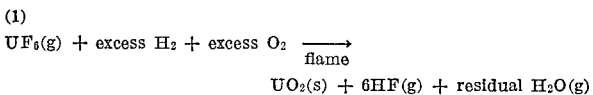

$$UF_6(g) + \text{excess } H_2 + \text{excess } O_2 \xrightarrow{\text{flame}}$$
$$UO_2(s) + 6HF(g) + \text{residual } H_2O(g)$$

While the mechanism of this reaction is not definitely known at this time, it is possible that this reaction occurs by way of free radical reactants formed in the flame. In any event the reaction proceeds rapidly to produce a particulate uranium dioxide rich product. It is to be emphasized that the foregoing reaction is in no way comparable chemically to a simple hydrolysis reaction such as the hydrolysis of silicon tetrachloride $$(SiCl_4 + H_2O \rightarrow SiO_2 + 4HCl)$$

or to a simple reduction reaction such as the reduction of uranyl fluoride to uranium dioxide $$(UO_2F_{2(s)} + H_2 \rightarrow UO_2(s) + 2HF)$$

One theoretical free radical reduction-hydrolysis reaction postulated for the conversion of uranium hexafluoride to uranium dioxide is as follows in which a dot after a chemical symbol defines a free radical:

(2) $H\cdot + UF_6 \rightarrow UF_5\cdot + HF$ (Reduction)

(3) 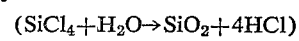 $UF_5\cdot + H_2 \rightarrow UF_3\cdot + 2HF$ (Reduction)

(4) $UF_3\cdot + H_2O \rightarrow UOF\cdot + 2HF$ (Hydrolysis)

(5) 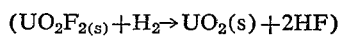 $UOF\cdot + H_2 \rightarrow UOH\cdot + HF$ (Reduction)

(6) $UOH\cdot + H_2O \rightarrow UO_2 + H_2 + H$

The cyclic nature of this postulated combined reduction and hydrolysis reaction along with the inherent ability of the reaction to maintain itself can be emphasized from the fact that the hydrogen free radical of Equation 6 is available for the incoming uranium hexafluoride of reaction (2). The foregoing reaction sequence is only proposed as one possible explanation of the mechanism of the conversion of uranium hexafluoride to uranium dioxide achieved by this invention.

DESCRIPTION OF THE DRAWINGS

Referring now to FIGS. 1 and 2, there is shown a reactor generally designated as 10 in which the process of ts this invention can be carried out. In the embodiment presented here, two tubes 11 mounted and sealed by seals 42 in cover 12 are used to introduce a reducing atmosphere in the reaction zone 18, such as a reducing gas selected from the group consisting of hydrogen, dissociated ammonia and mixtures thereof. The cover 12 forms a tight seal with vessel 13. The cover 12 has an inlet of concentric tubes 14 and 15 with tube 14 being sealed by seal 41 in cover 12. Tube 14 extends further into the reaction zone 18 than tube 15 by the distance designated $d$. Tube 15 is sealed tightly by seal 17 in tube 14 at a point external to the reactor 10. Igniter 16 is provided to initiate the reaction.

In the practice of this invention a continuous flow of the reducing gas is maintained throughout the reaction at a sufficient rate so that a strong reducing atmosphere is maintained in the reaction zone 18. A shielding gas is fed through tube 14 in the direction of the arrows into the reaction zone 18 and a gaseous reactant comprising a mixture of uranium hexafluoride and an oxygen-containing carrier gas is fed into the reaction zone 18 in tube 15 in the direction of the arrow. The flows of the gases in tubes 14 and 15 occur so that the shielding gas in tube 14 surrounds the gaseous reactant in tube 15 as the gases enter the reaction zone 18. The shielding gas shields the mixture of uranium hexafluoride and carrier gas from the reducing gas for sufficient time so that the boundary of initiation of the reaction flame in the reaction zone 18 is removed from the inlet formed by tubes 14 and 15 (called a "lifted flame"). The reaction results in a bright orange flame.

Figure 1:
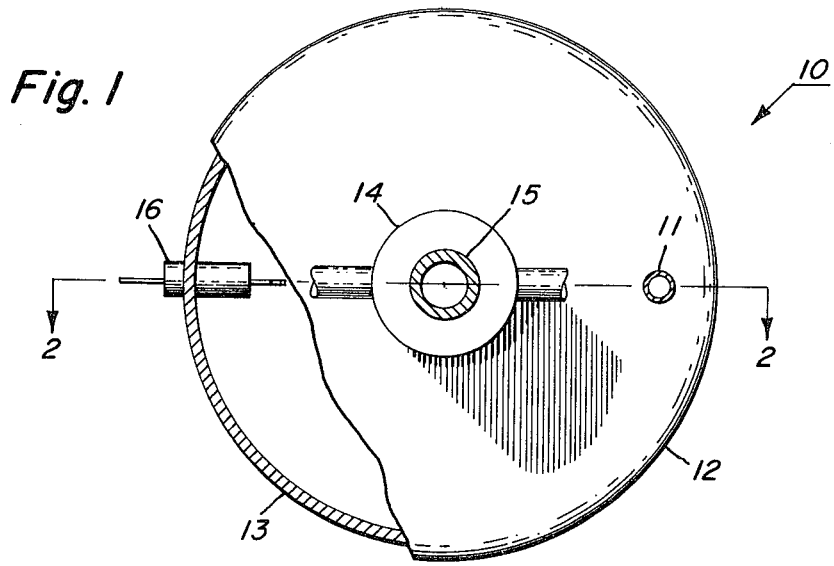
FIGS. 1 and 2 show respectively a top view partially cut away and a cut away side view of the upper portion of one reactor used in the practice of this invention, the reactor having a nozzle comprising a pair of concentric inlets for introducing the gaseous reactants to the reaction zone with the larger diameter inlet extending in the flow direction beyond the outlet end of the smaller diameter inlet.
Figure 2:
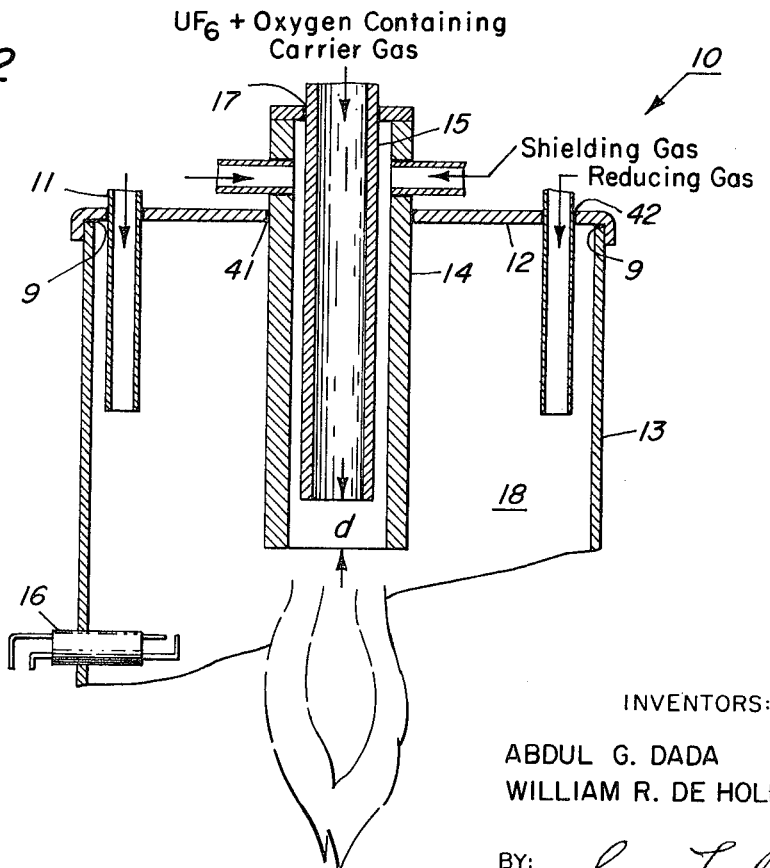

In practice of the process in the apparatus of FIGS. 1 and 2, it is preferred to start the process with the reaction zone preheated to a temperature of at least about 100° C. to prevent the condensation of water vapor in the reaction zone. This prevents build-up of the uranium dioxide rich powders on the vessel 13 during the process run. This initial heating can be accomplished by external heating means or by letting the oxygen-containing carrier gas react with the reducing atmosphere for a sufficient time to achieve at least about 100° C. in temperature in the reaction zone 18 before introducing the gaseous uranium hexafluoride to the reaction zone. Prior to operation, the reaction zone can be purged with a gas inert to the reaction such as nitrogen.

In one preferred processing sequence with the apparatus of FIGS. 1 and 2, the reducing atmosphere is first established in the reaction zone. Then the flow of shielding gas in tube 14 is started, followed in a short time by the introduction of the oxygen-containing carrier gas in tube 15 with operation of igniter 16 to produce a flame, and subsequently followed by the introduction of uranium hexafluoride in tube 15 so that it mixes with the oxygen-containing carrier gas. In another preferred startup sequence, the oxygen-containing carrier gas is first introduced in the reaction zone in tube 15. Then the flow of shielding gas in tube 14 is started, followed in a short time by the introduction of the reducing gas with operation of the igniter 16 to produce a flame, and subsequently followed by introduction of uranium hexafluoride in tube 15. The flow of the gases into the reaction zone is controlled so that the molar ratio of hydrogen to uranium hexafluoride is at least greater than stoichiometric proportions with a preferred lower limit of about 4.0 and the molar ratio of oxygen to uranium hexafluoride is at least greater than stoichiometric proportions with a preferred lower limit of about 1.2.

The reaction is conducted with a flame temperature of at least about 750° C. or higher. The reaction zone is preferably maintained below atmospheric pressure by using a vacuum pump to draw about 1 to about 25 inches, preferably about 5 to about 15 inches, of mercury so that the reaction products are rapidly withdrawn from the reaction zone. The particular vacuum employed provides a way of controlling the properties of the resulting uranium dioxide. The higher vacuum conditions produce a fine ceramic powder having a relatively low fluoride content, and if any leaks develop during the process, fluoride-containing gases do not escape to the surrounding environment. The lower vacuum conditions produce a coarse ceramic powder having a relatively higher fluoride content than the powder produced under higher vacuum conditions. Vacuum conditions can be adjusted to yield the desired particle size of the ceramic powder. The powder so produced has been found capable of being sintered to a compact ceramic structure of controlled density. One can periodically vary the vacuum conditions during operation to produce a mixture of particle sizes when desired. It should be noted that this invention can be practiced at atmospheric pressure conditions or under applied pressure but any leaks that develop in the system are outward so it is preferred to apply a vacuum.

Figure 3:
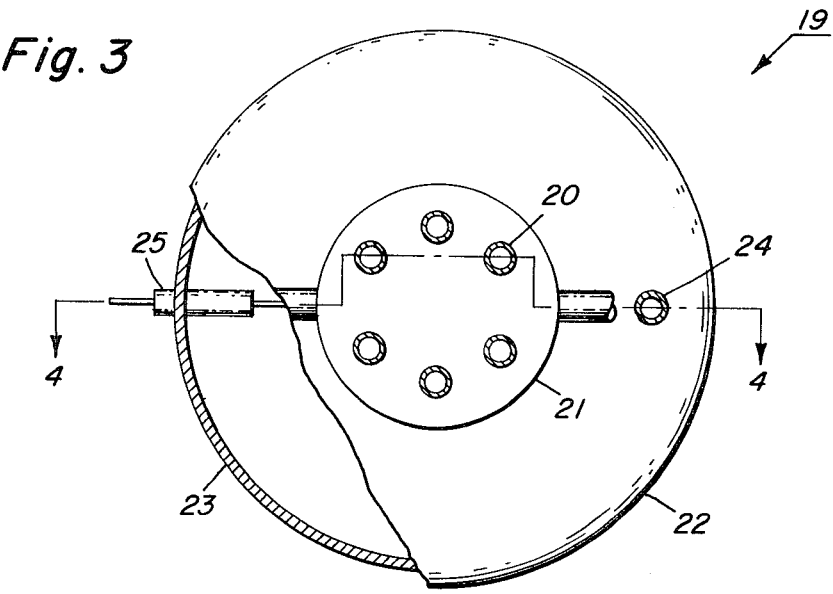
FIGS. 3 and 4 show respectively a top view partially cut away and a cut away side view of the upper portion of another reactor used in the practice of this invention, the reactor having a nozzle comprising a multiplicity of smaller diameter inlets for introducing multiple streams of reactants to the reaction zone, the smaller diameter inlets being arranged within and surrounded by a larger diameter inlet used for introducing the shielding gas to the reaction zone and the larger diameter inlet extending in the flow direction beyond the outlet end of the smaller diameter inlets.
Figure 4:
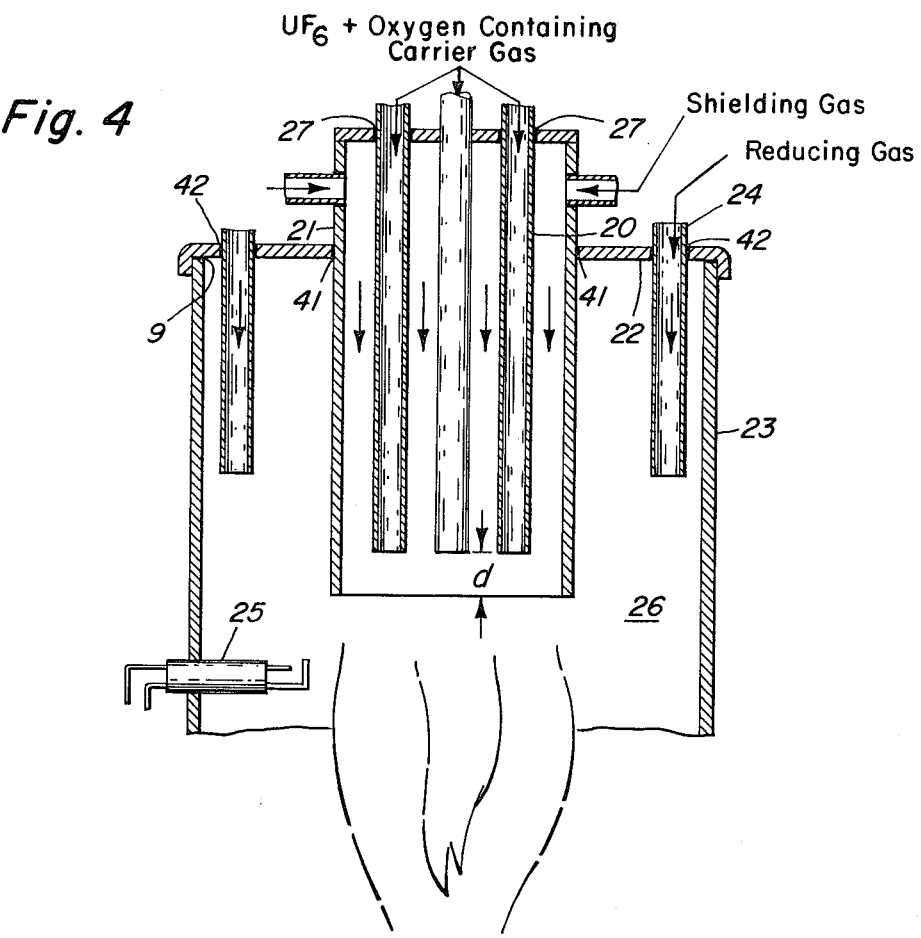

Referring now to FIGS. 3 and 4, there is shown a reactor inlet having a multiplicity of tubes for the mixture of uranium hexafluoride and the oxygen-containing carrier gas which enables higher rates of production of the uranium dioxide rich product. In FIG. 3, a partially cut away top view of this embodiment of the reactor generally numbered 19 is presented. FIG. 4 is a partially cut away sectional side view of the reactor taken along line 4—4 in FIG. 3. Here a multiplicity of tubes 20 of shorter length are enclosed within a larger, longer tube 21, with tube 21 being mounted and sealed by seals 41 in cover 22 of the reactor 19. Tubes 20 are shown symmetrically positioned within the tube 21 on a circle greater than one-half the outside diameter of tube 21. Cover 22 is sealed by seal 9 on vessel 23 enclosing a reaction zone 26. Tubes 24, mounted and sealed by seals 42 in cover 22, are used to introduce into the reaction zone the reducing gases previously listed. Igniter 25 is provided to initiate the reaction. A continuous flow of the reducing gas is maintained throughout the reaction so that a strong reducing atmosphere is maintained in the reaction zone. Tubes 20 are sealed tightly by seals 27 in tube 21 at a point external to the reactor 19. In the practice of this invention a shielding gas is fed in the direction shown through tube 21 into the reaction zone so that the shielding gas surrounds the mixture of the gaseous reactants of uranium hexafluoride and an oxygen-containing carrier gas fed into the reaction zone in tube 20 in the direction shown. The enveloping gas shields the uranium hexafluoride-carrier gas mixture from the reducing atmosphere for sufficient time so that the boundary marking the initiation of the reaction flame is displaced or removed from the end of tube 21 (resulting in a "lifted flame"). The reaction results in a bright orange flame. The shielding gas, the reducing gas and the carrier gas can be selected from those previously listed. The preferred practices of the process described above in reference to FIGS. 1 and 2 are also applicable to the process using the apparatus presented in FIGS. 3 and 4.

Figure 5:
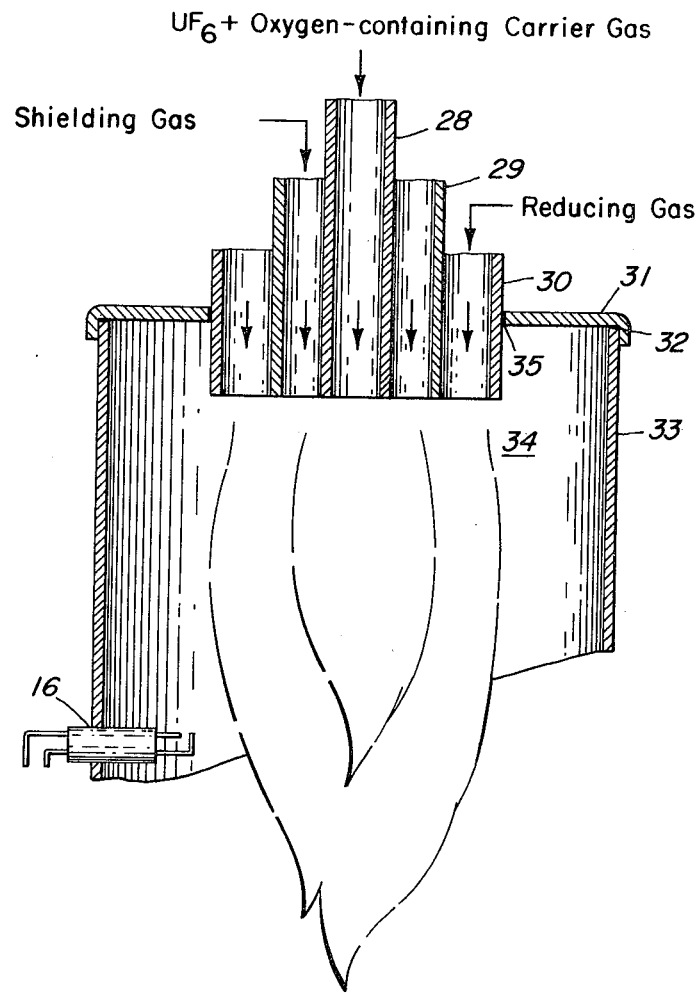
FIG. 5 shows a cut away side view of another reactor used in the practice of this invention, the reactor having a nozzle comprising three concentric tubes for introducing the gaseous reactants to the reaction zone, the tubes extending equal distances into the reaction zone.

Referring now to FIG. 5, another apparatus for the practice of the process of this invention is presented. A partially cut away sectional side view of the reactor is shown in which the inlet has three concentric tubes 28, 29 and 30 entering cover 31. Cover 31 is sealed by seal 32 on vessel 33 enclosing a reaction zone 34. Igniter 16 is provided to initiate the reaction. In one arrangement, tube 28 is used to introduce the first gaseous reactant, a mixture of uranium hexafluoride and an oxygen-containing carrier gas as described above. The second gaseous reactant, the reducing gas, is introduced to the reaction zone 34 in the tube 30 which is sealed by seal 35 to cover 31. Tube 29 is used to introduce the shielding gas separating the first gaseous reactant from the second gaseous reactant. In another arrangement, tube 28 can be used to introduced the reducing gas and tube 30 can be used to introduce the mixture comprising uranium hexafluoride and an oxygen-containing carrier gas. Tubes 28, 29 and 30 extend an equal distance into reaction zone 34 but with appropriate control of the velocities of the incoming gases a lifted flame is maintained during the conversion of uranium hexafluoride. The preferred practices of the process described above in reference to FIGS. 1 and 2 are also applicable to the process using the apparatus presented in FIG. 5.

The velocity at which the gaseous mixture comprising uranium hexafluoride and an oxygen-containing carrier gas is introduced into the reaction zone is important. It has been found that the rate of flow of this mixture should be controlled so as to provide a gas velocity at the inlet which exceeds the flame propogation velocity. In this way the flame remains lifted away from the inlet to the reaction zone. The distance the flame is removed from tubes 28–30 in FIG. 5, tube 21 in FIG. 4 and tube 14 in FIG. 2 is critical to the shape of the flame. If the distance is too great, there tends to be incomplete conversion of the uranium hexafluoride to oxide and if the distance is too small, the flame tends to burn too close to the tubes, eventually leading to a build-up of reaction products, and condensation of water vapor on the tips of the tubes, resulting in plugging of the tubes.

The thickness, L, of the shielding gas around the reactants can be estimated from the formula: $L^2=kDt$, in which L is the radial thickness of the shielding gas between the stream of first and second reactants, D is a diffusion constant, $t$ is the delay time required for the reducing atmosphere and the mixture of $UF_6$ and carrier gas to diffuse through the shielding gas and $k$ is another constant. In general, the thickness of the shielding gas is proportional to the square root of the time of diffusion of the reactants through the shielding gas.

The reactors illustrated in FIGS. 1 through 5 preferably have a removable sealed cover on the vessel. The vessel and cover can be made of any material which is inert to the conversion reaction. Representative materials including Pyrex®, glass and various metals and alloys such as steels and Monel®. Various sealing means can be used between the removable cover and the reactor vessel including high temperature rubbers and high temperature polymeric sealants such as Teflon®. The ignition means can be any of several devices for repetitively producing a spark in the reaction zone with one such device comprising a spark plug being in the proximity of the desired reaction flame but not close enough to the flame to receive deposition of reaction products. An alternative approach is to employ a pilot flame. The gas inlet tubes can be selected from various materials inert to the process including ceramic materials such as alumina and metallic materials such as Monel®. The reactor vessel can be cylindrical in shape for ease of assembly, and the foregoing materials used for the vessel are readily available in cylindrical pipe form which can be cut to the desired length. A typical vessel is from two to six feet in length with diameter of from five to twenty inches. In FIGS. 1 to 4, it will be noted that inlets 15 and 20 are positioned in inlets 14 and 21 respectively so that they terminate within the larger inlets by a distance $d$ which can range from ⅛ of an inch to ½ of an inch. Generally, the larger the diameter of pipes 14 and 21, the greater is distance $d$.

The present invention has many advantages in the conversion of uranium hexafluoride to a uranium dioxide rich composition. One important advantage is avoidance of depositions of reaction products on the reactant inlet. Further, the present invention permits greatly increased rates of flow of uranium hexafluoride with permissible flow rates being at least about five pounds per hour per ¼ inch inside diameter nozzle introducing the $UF_6$-carrier gas mixture. This is in contrast to previous practice which was able at best to achieve uranium hexafluoride flow rates in the order of fractions of a pound per hour with intermittent plugging of the reactant inlets.

The process of this invention can be practiced with a variety of reducing, carrier and shielding gases. While hydrogen is an excellent gas for the reducing atmosphere, less costly gases such as dissociated ammonia or mixtures of hydrogen and dissociated ammonia can be employed as the reducing atmosphere with excellent results. Oxygen is an excellent carrier gas for the uranium hexafluoride, but less costly mixtures of air and uranium hexafluoride or mixtures of air, oxygen and uranium hexafluoride can be employed with excellent results. Nitrogen, air and mixtures thereof serve as excellent shielding gases. Table 1 lists representative gases which have been employed together to give successful conversion of uranium hexafluoride to a uranium dioxide rich composition by the flame conversion process of this invention.

TABLE 1

|  | Reaction A | Reaction B | Reaction C |
|---|---|---|---|
| Reducing gas | Hydrogen | Dissociated ammonia. | Hydrogen. |
| Carrier gas | Oxygen | Oxygen | Air. |
| Shielding gas | Nitrogen | Nitrogen | Air. |

|  | Reaction D | Reaction E | Reaction F |
|---|---|---|---|
| Reducing gas | Dissociated ammonia. | Hydrogen | Dissociated ammonia. |
| Carrier gas | Air | Oxygen | Oxygen. |
| Shielding gas | Air | Air | Air. |

|  | Reaction G | Reaction H | Reaction I |
|---|---|---|---|
| Reducing gas | Hydrogen | Dissociated ammonia. | Mixture of hydrogen and dissociated ammonia. |
| Carrier gas | Air | Air | Mixture of oxygen and air. |
| Shielding gas | Nitrogen | Nitrogen | Mixture of nitrogen and air. |

In the present invention there is a considerable range within which the molar proportions of the reactants can be varied. In particular the molar ratios of hydrogen to uranium hexafluoride and oxygen to uranium hexafluoride can be varied widely as long as these ratios are greater than stoichiometric proportions and preferably above 4.0 and 1.2, respectively. Exceeding these minimum ratios assures substantially complete conversion of the uranium hexafluoride to uranium dioxide and the absence of further oxidation of the uranium dioxide to higher oxides such as $U_3O_8$. Variation of the $H_2/UF_6$ molar ratio to higher values above stoichiometric proportions produces a uranium dioxide powder having lower fluoride concentration and higher surface areas. The variation of the $O_2/UF_6$ molar ratio above stoichiometric proportions allows variation in the concentration of the off-gases from the reaction zone, with the higher $O_2/UF_6$ ratios giving a more dilute hydrogen fluoride off-gas.

Studies on the uranium dioxide powders produced in the practice of this invention indicate them to have superior properties. The powder is greater than 95 percent by weight of uranium dioxide, the balance being largely fluoride ions mostly in the form of hydrogen fluoride with some $UF_4$, $U_3O_8$, $U_4O_9$ and $UO_2F_2$. The powder has excellent surface properties with high relative surface area compared to uranium dioxide powders produced by the prior art processes. It is believed that these limited impurities in the powder prevent the powder from exhibiting any pyrophoric tendencies because the bond of the hydrogen fluoride with the uranium dioxide is not displaced by oxygen. Further, this hydrogen fluoride-uranium dioxide bond permits the powder to be handled without skin irritation. These powders can be readily sintered in compacted shapes in controlled atmospheres to achieve up to 99+% of the theoretical density.

Those skilled in the art will gain a further understanding of this invention from the following illustrative, but not limiting, examples of the invention.

EXAMPLE 1

A reactor similar to that shown in FIGS. 1 and 2 is assembled with two concentric alumina tubes 14 and 15. The larger tube 14 is ¾ inch in outside diameter and ½ inch in inside diameter, and the smaller tube 15 is ⅜ inch in outside diameter and ¼ inch in inside diameter. Tube 15 fits through and is sealed into an opening in tube 14. The distance d between the tip of the smaller tube and the larger tube is ¼ inch. The reactor vessel 13 is a 6-inch diameter schedule 40 Pyrex® glass pipe 36 inches long provided with end flanges. The upper flange of the vessel fits a flange on a Monel® plate 12 which is slightly over 6 inches in diameter with openings receiving tube 14 used to introduce the shielding gas into the reaction zone and tubes 11 used to introduce the hydrogen into the reaction zone. Tubes 11 are made of alumina with ⅜ inch outside diameter and ¼ inch inside diameter. The bottom flange of the reactor vessel is connected to a Pyrex® pipe reducer 6 inches in diameter where it connects with vessel 13 and tapering to a diameter of 1 inch. The pipe reducer is connected to a powder collection vessel having sintered porous Monel® filters to separate uranium dioxide and other solids from the off-gases of the reactor. The collection vessel is connected to a water cooled condenser to condense hydrogen fluoride and water vapor from the off-gases. The condenser is connected in series to a liquid nitrogen cold trap to freeze any remaining hydrogen fluoride and water vapor in the off-gases. This trap is then connected to a drying column to trap traces of moisture and hydrogen fluoride. The drying column is connected to a vacuum pump which draws a vacuum on the reactor system. The outlet of the vacuum pump is connected to a flame arrester and an off-gas burner to burn any hydrogen in the gas being released to the air.

A cylinder of uranium hexafluoride gas and a cylinder of oxygen as the carrier gas are connected to tube 15 so controlled mixtures of these gases can be metered into the reactor. Before the process is started the cylinder of uranium hexafluoride is heated in a water bath to a temperature in the range of 140 to 180° F. by use of an electric immersion heater. Cylinders of hydrogen are connected to tubes 11 and a source of nitrogen is connected to tube 14. The nitrogen is the shield gas which functions as a temporary barrier between the reducing atmosphere of hydrogen and the oxygen-uranium hexafluoride mixture for a sufficient time so that the reaction flame forms in a region away from the end of tube 14.

The following sequence is used to initiate the conversion of uranium hexafluoride to uranium dioxide. The reactor is purged with nitrogen through tube 14 for about five minutes to achieve an oxygen-free atmosphere. The nitrogen flow is then stopped and a reducing atmosphere is established in the reactor by flowing hydrogen through tubes 11 at the rate of 0.0682 pound moles per hour. The ignition means is turned on to create a regular spark in the reactor followed by introduction of the nitrogen shield gas through tube 14. Next the oxygen carrier gas is introduced into the reactor through tube 15 which gives a bluish flame which begins about ½ inch from the tip of tube 14. After the flame reaches equilibrium, the uranium hexafluoride flow is started in tube 15, initially in small quantities with gradually increasing rate of flow up to a rate of about 0.00304 pound moles per hour. Under these conditions, the molar ratio of the oxygen to uranium hexafluoride is about 2.4. With the introduction of uranium hexafluoride, a change to a bright orange flame is noted. The vacuum drawn on the reactor system is 8 inches of mercury.

The reaction proceeds with the unique feature of avoiding contact of the reaction products with the tip of the tubes 14 and 15. It is noted that the flame is lifted or removed from tube 14 approximately ½ inch throughout the run. This means that the formation of uranium dioxide product is occurring out of contact with the tubes 14 and 15. Tremendous improvements over the prior art are noted in the process of this invention. High rates of uranium hexafluoride flows and long runs are achieved without plugging of the reactor inlets. This experiment is conducted for ten minutes producing 0.13 pounds of uranium dioxide having a 2.6% by weight fluoride ion concentration.

EXAMPLES 2–7

The process of Example 1 is repeated using the same general procedure with the variation in the parameters noted in Table 2. Table 2 reports in consecutive columns the example number, the rate of flow of uranium hexafluoride in pounds per hour to the reactor, the total time of the processing run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ions in the resulting uranium dioxide powder, the vacuum drawn on the reactor during the process, and the surface area in square meters per gram of the uranium dioxide produced in the reactor. The effective molar ratio of hydrogen to uranium hexafluoride is given for the reducing gas where the reducing gas is either hydrogen or dissociated ammonia. The effective molar ratio of oxygen to uranium hexafluoride takes into consideration all sources of oxygen whether from the carrier gas or the shielding gas. The content of the fluoride ion in the uranium dioxide powder is determined by pyrolysis. Dashes indicate the particular property was not measured for that processing run.

TABLE 2.—URANIUM HEXAFLUORIDE CONVERSION

| Example | $UF_6$ flow, lbs./hr. | Time of process | Composition of— | | | Effective molar ratios | | Percent F in $UO_2$ | Reactor vacuum in inches of mercury | Surface area of $UO_2$ |
| --- | --- | --- | --- | --- | --- | --- | --- | --- | --- | --- |
| | | | Reducing gas | Carrier gas | Shielding gas | $H_2/UF_6$ | $O_2/UF_6$ | | | |
| 2 | 1.20 | 10 | $H_2$ | $O_2$ | $N_2$ | 15.8 | 5.7 | 4.7 | 8 | 9.6 |
| 3 | 4.20 | 10 | $H_2$ | $O_2$ | $N_2$ | 6.1 | 2.2 | 6.1 | 5 | 8.0 |
| 4 | 3.90 | 10 | $H_2$ | Air | Air | 7.1 | 2.8 | | 5 | |
| 5 | 1.50 | 5 | $H_2$ | $O_2$ | $N_2$ | 18.0 | 7.0 | 7.2 | 2 | |
| 6 | 2.70 | 10 | Dissociated $NH_3$ | $O_2$ | $N_2$ | 8.8 | 3.3 | 6.7 | 10 | 14.1 |
| 7 | 5.70 | 12 | $H_2$ | $O_2$ | $N_2$ | 4.2 | 1.2 | 9.8 | 12 | 11.1 |

EXAMPLE 8

A reactor similar to that shown in FIGS. 3 and 4 is assembled with six alumina tubes 20 of ⅜ inch outer diameter and ¼ inch inner diameter and equally spaced around a 1½ inch diameter circle. The tubes 20 are positioned inside an alumina tube 21 of 2¼ inches inside diameter and 2½ inches outside diameter. The distance d between the tip of the smaller tubes and the larger tube is ⅜ inch.

The reactor vessel 23 is a 6-inch diameter schedule 40 Pyrex® glass pipe 36 inches long provided with end flanges, and the upper flange fits a flange on a Monel® plate slightly larger than 6 inches in diameter with openings receiving tube 21 and tubes 24. Tubes 20 fit through openings in tube 21 (as shown in FIGS. 3 and 4) and are tightly sealed into tube 21. The bottom flange of the reactor vessel is connected to a Pyrex® pipe reducer as described for the reactor in Example 1. The pipe reducer is connected in series to a powder collection vessel with process Monel® filters, a water cooled condenser, a liquid nitrogen cold trap, a drying column, a vacuum pump and a gas burner as in Example 1.

A source of uranium hexafluoride gas and a source of oxygen as the carrier gas are connected to tubes 20 so controlled mixtures of these gases can be metered into the reactor. Before the process is started the cylinder of uranium hexafluoride is heated in a water bath to a temperature in the range of 140 to 180° F. by use of an electric immersion heater. Cylinders of hydrogen are connected to tubes 24 and a source of nitrogen is connected to tube 21. The nitrogen acts as a shield gas between the hydrogen reactant and the oxygen-uranium hexafluoride mixture reactant for a sufficient time so that the reaction flame producing uranium dioxide begins away from tube 21.

The following sequence is used to initiate the uranium hexafluoride conversion to uranium dioxide. The reactor is purged with nitrogen through tube 21 for about five minutes to achieve an oxygen-free atmosphere after which the nitrogen is stopped and a reducing atmosphere is established in the reactor by flowing hydrogen through tubes 24. The ignition means is turned on to create a regular spark in the reactor followed by introduction of the nitrogen shielding gas through tube 21. Next the carrier gas of oxygen is introduced into the reactor through tubes 20 which gives a bluish flame which is removed from the tip of tube 21. After the flame reaches equilibrium, the uranium hexafluoride is metered through tubes 20, initially at low rates with a gradually increasing rate until a rate of about 4 pounds per hour per tube is attained. When the operating flow rate for the uranium hexafluoride is reached, the molar ratio of the oxygen to uranium hexafluoride is lower than 2.6 and generally around 2.2. With the introduction of uranium hexafluoride, a change in the color of the flame to bright orange is noted. The vacuum drawn on the reactor system is 6 inches of mercury. The reaction proceeds with the unique feature of avoiding contact of the reaction products with the tip of tubes 20 and 21. It is noted that the flame is lifted or removed from tube 21 approximately ½ inch throughout the run. This means that the formation of uranium dioxide product is occurring out of contact with tubes 20 and 21.

This experiment was conducted for 15 minutes producing 0.75 pound of uranium dioxide having 2.2% by weight fluoride ion. The fluoride ion content in the uranium dioxide powder is determined by pyrolysis.

EXAMPLES 9–28

The process of Example 8 is repeated using the same general procedure with the variations in the parameters noted in Table 3. Table 3 reports in consecutive columns the example number, the rate of flow of uranium hexafluoride in pounds per hour to the reactor, the total time in minutes of the process run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ion in the resulting uranium dioxide product, the vacuum condition drawn on the reactor during the process and the surface area of the uranium dioxide in square meters per gram produced in the conversion reaction. The effective molar ratio of hydrogen is given for the reducing gas where the reducing gas is either hydrogen or ammonia dissociated to give hydrogen. The effective molar ratio of oxygen to uranium hexafluoride takes into consideration all sources of oxygen whether from the carrier gas or shielding gas. The content of the fluoride ion in the uranium dioxide powder and pellets is determined by pyrolysis. Dashes indicate the property was not measured for that processing run.

TABLE 3.—URANIUM HEXAFLUORIDE CONVERSION

| Example | $UF_6$ flow, lbs./hr. | Time of process | Composition of— | | | Effective molar ratios | | Percent F in $UO_2$ | Reactor vacuum in inches of mercury | Surface area of $UO_2$ |
|---|---|---|---|---|---|---|---|---|---|---|
| | | | Reducing gas | Carrier gas | Shielding gas | $H_2/UF_6$ | $O_2/UF_6$ | | | |
| 9 | 4.0 | 15 | $H_2$ | $O_2$ | $N_2$ | 10.6 | 3.6 | 2.2 | 6 | 7.50 |
| 10 | 3.4 | 23 | $H_2$ | $O_2$ | $N_2$ | 8.0 | 2.7 | 4.8 | 8 | 8.70 |
| 11 | 6.7 | 5 | $H_2$ | $O_2$ | $N_2$ | 8.2 | 2.2 | 4.1 | 15 | 6.80 |
| 12 | 3.3 | 15 | $H_2$ | $O_2$ | $N_2$ | 17.8 | 5.3 | 1.7 | 10 | 8.00 |
| 13 | 10.0 | 16 | $H_2$ | Air | Air | 6.9 | 2.1 | 4.0 | 12 | 8.00 |
| 14 | 1.0 | 10 | $H_2$ | Air | Air | 7.2 | 2.6 | 3.7 | 15 | |
| 15 | 4.0 | 12 | $H_2$ | Air | Air | 11.0 | 1.9 | 3.8 | 8 | |
| 16 | 5.2 | 21 | $H_2$ | $O_2$ | $N_2$ | 11.3 | 3.0 | 4.0 | 10 | 9.49 |
| 17 | 14.5 | 6 | $H_2$ | Air | Air | 4.7 | 1.4 | 9.0 | 8 | 5.60 |
| 18 | 6.0 | 31 | $NH_3$ | $O_2$ | $N_2$ | 9.8 | 2.3 | 5.7 | 6 | |
| 19 | 14.0 | 15 | $NH_3$ | Air | Air | 4.9 | 1.5 | 3.3 | 15 | 8.88 |
| 20 | 5.6 | 10 | $NH_3$ | Air | Air | 10.0 | 3.5 | 3.9 | 10 | |
| 21 | 8.9 | 15 | $H_2$ | Air | Air | 7.0 | 2.6 | 5.2 | 10 | 8.97 |
| 22 | 8.4 | 25 | $H_2$ | Air | Air | 8.7 | 2.0 | 4.6 | 15 | |
| 23 | 3.1 | 30 | $NH_3$ | Air | $N_2$ | 20.1 | 5.2 | 2.2 | 15 | |
| 24 | 3.7 | 25 | $H_2$ | $O_2$ | Air | 18.0 | 8.0 | 2.6 | 18 | |
| 25 | 6.1 | 29 | $NH_3$ | Air | Air | 8.4 | 3.3 | 0.6 | 10 | |
| 26 | 2.7 | 10 | $H_2$ | Air | Air | 17.1 | 5.9 | 0.2 | 15 | |
| 27 | 6.0 | 26 | $H_2$ | Air | Air | 8.5 | 3.1 | 1.9 | 8 | |
| 28 | 9.7 | 30 | $NH_3$ | Air | Air | 5.7 | 2.2 | 6.1 | 6 | |

EXAMPLES 29–44

The process of Example 8 is repeated substituting a Monel® reactor of 6 inches in diameter and 36 inches in length with end flanges for the 6-inch diameter schedule 40 Pyrex® glass pipe of Example 8. Otherwise the same procedure of Example 8 is practiced except for the variations in parameters noted in Table 4. Table 4 reports in consecutive columns the example number, the rate of flow of uranium hexafluoride in pounds per hour to the reactor, the total time in minutes of the process run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ion in the resulting uranium dioxide product, the vacuum condition maintained in the reactor during the process and the surface area of the uranium dioxide produced in the reactor. The effective molar ratio of hydrogen is given for the reducing gas where the reducing gas is either hydrogen or ammonia dissociated to give hydrogen. The effective molar ratio of oxygen to uranium hexafluoride takes into consideration all sources of oxygen whether from the carrier gas or shielding gas. The content of the fluoride ion in the uranium dioxide powder is determined by pyrolysis.

TABLE 4.—URANIUM HEXAFLUORIDE CONVERSION IN MONEL® REACTOR

| Example | UF₆ flow, lbs./hr. | Time of process | Composition of— | | | Effective molar ratios | | Percent F⁻ in UO₂ | Vacuum in inches of mercury | UO₂ surface area, meters²/gm. |
|---|---|---|---|---|---|---|---|---|---|---|
| | | | Reducing gas | Carrier gas | Shielding gas | H₂/UF₆ | O₂/UF₆ | | | |
| 29 | 2.0 | 45 | H₂ | Air | Air | 29.6 | 10.4 | 0.9 | 15 | 8.42 |
| 30 | 11.0 | 13 | H₂ | Air | Air | 5.0 | 1.7 | 3.2 | 12 | 8.42 |
| 31 | 6.1 | 28 | H₂ | O₂ | N₂ | 12.0 | 4.2 | 1.5 | 10 | 7.07 |
| 32 | 8.9 | 39 | NH₃ | Air | Air | 8.3 | 3.7 | 3.0 | 17 | 11.42 |
| 33 | 20.0 | 21 | H₂ | O₂ | N₂ | 4.1 | 1.6 | 4.5 | 11 | 4.86 |
| 34 | 9.5 | 25 | NH₃ | Air | Air | 5.7 | 2.4 | 4.0 | 11 | 7.47 |
| 35 | 3.2 | 48 | H₂ | Air | Air | 16.3 | 6.7 | 2.6 | 13 | 11.98 |
| 36 | 6.8 | 61 | H₂ | O₂ | Air | 11.4 | 4.3 | 2.7 | 14 | 6.67 |
| 37 | 2.2 | 38 | H₂ | Air | Air | 39.6 | 12.6 | 2.1 | 10 | 7.11 |
| 38 | 7.5 | 60 | H₂ | Air | Air | 10.0 | 2.3 | 4.8 | 12 | 7.10 |
| 39 | 9.4 | 36 | H₂ | Air | Air | 6.8 | 2.0 | 5.1 | 10 | 7.47 |
| 40 | 5.6 | 47 | NH₃ | Air | Air | 13.8 | 3.1 | 4.8 | 10 | 8.27 |
| 41 | 17.0 | 30 | NH₃ | O₂ | N₂ | 5.9 | 2.0 | 4.2 | 10 | 5.64 |
| 42 | 15.0 | 18 | NH₃ | O₂ | Air | 8.0 | 3.0 | 2.7 | 13 | 4.96 |
| 43 | 15.3 | 14 | H₂ | O₂ | N₂ | 6.0 | 2.5 | 3.3 | 12 | 5.02 |
| 44 | 11.0 | 5 | NH₃ | Air | Air | 8.3 | 2.9 | 2.5 | 2 | |

EXAMPLES 45–54

The process of Example 8 is repeated substituting a Monel® reactor of 6 inches in diameter and 36 inches in length with end flanges for the 6-inch diameter schedule 40 Pyrex® glass pipe of Example 8 and substituting all Monel® inlets for the alumina inlets used in Example 8. This has the advantage that any impurities in the resulting uranium dioxide from the reactor are held to a minimum and are of the same composition. Otherwise the same procedure of Example 8 is practiced with the variations in parameters noted in Table 5. Table 5 reports in consecutive columns the example number, the rate of flow of uranium hexafluoride in pounds per hour to the reactor, the total time in minutes of the process run, the composition of the reducing gas, the composition of the carrier gas, the composition of the shielding gas, the effective molar ratios of hydrogen to uranium hexafluoride and oxygen to uranium hexafluoride in the reactor during processing, the weight percentage of fluoride ion in the resulting uranium dioxide product and the vacuum condition maintained in the reactor during the process. The effective molar ratio of hydrogen is given for the reducing gas where the reducing gas is either hydrogen or ammonia dissociated to give hydrogen. The effective molar ratio of oxygen to uranium hexafluoride takes into consideration all sources of oxygen whether from the carrier gas or the shielding gas. The content of the fluoride ion in the uranium dioxide powder is determined by pyrolysis.

TABLE 5.—URANIUM HEXAFLUORIDE CONVERSION IN MONEL® REACTOR

| Ex. | UF₆ flow, lbs./hr. | Time in minutes of process | Composition of— | | | Effective molar ratios | | Percent F⁻ in UO₂ | Vacuum in inches of mercury |
|---|---|---|---|---|---|---|---|---|---|
| | | | Reducing gas | Carrier gas | Shielding gas | H₂/UF₆ | O₂/UF₆ | | |
| 45 | 12.7 | 18 | H₂ | O₂ | N₂ | 21.4 | 8.6 | 2.5 | 16.0 |
| 46 | 20.0 | 60 | H₂ | Air | Air | 12.8 | 5.1 | 2.8 | 9.0 |
| 47 | 23.5 | 75 | NH₃ | Air | Air | 7.0 | 2.3 | 6.7 | 10.0 |
| 48 | 16.3 | 180 | NH₃ | Air | Air | 10.4 | 3.0 | 6.5 | 9.0 |
| 49 | 15.2 | 183 | NH₃ | Air | Air | 9.7 | 3.3 | 5.0 | 9.5 |
| 50 | 17.8 | 62 | NH₃ | Air | Air | 12.7 | 3.9 | 5.9 | 9.5 |
| 51 | 15.4 | 117 | NH₃ | Air | Air | 10.0 | 4.0 | 5.4 | 11.5 |
| 52 | 13.6 | 116 | NH₃ | Air | Air | 13.2 | 4.4 | 3.7 | 11.0 |
| 53 | 11.5 | 158 | NH₃ | Air | Air | 24.0 | 7.4 | 2.7 | 5.2 |
| 54 | 16.7 | 209 | NH₃ | Air | Air | 16.4 | 4.5 | 2.4 | 6.5 |

As will be apparent to those skilled in the art, various modifications and changes may be made in the method and apparatus described herein. It is accordingly the intention that the invention be construed in the broadest manner within the spirit and scope as set forth in the accompanying claims.

What is claimed is:

1. The method of preparing a uranium dioxide rich composition from uranium hexafluoride in a reaction zone in the presence of an active flame comprising the steps of:
   (a) introducing a first gaseous reactant comprising a mixture of uranium hexafluoride and an oxygen-containing carrier gas into the reaction zone,
   (b) separately introducing a second gaseous reactant comprising a reducing gas into the reaction zone, and
   (c) separately introducing a shielding gas into the reaction zone between said first gaseous reactant and said second gaseous reactant which temporarily prevents substantial mixing and reaction between said first gaseous reactant and said second gaseous reactant until sufficient cross diffusion of said reactants occurs as said reactants pass through the reaction zone.

2. The method of claim 1 where the method is initiated by the sequential steps of:
   (a) introducing the reducing gas into the reaction zone,
   (b) introducing the shielding gas into the reaction zone,
   (c) introducing the oxygen-containing carrier gas into the reaction zone, and
   (d) introducing the uranium hexafluoride to form a mixture with the oxygen-containing carrier gas with the mixture entering the reaction zone temporarily separated from the reducing gas by the shielding gas.

3. The method of claim 2 in which the oxygen-containing carrier gas and the uranium hexafluoride are introduced simultaneously into the reaction zone.

4. The method of claim 1 where the method is initiated by the sequential steps of:
   (a) introducing the oxygen-containing carrier gas into the reaction zone,
   (b) introducing the shielding gas into the reaction zone,
   (c) introducing the reducing gas into the reaction zone, and
   (d) introducing the uranium hexafluoride to form a mixture with the oxygen-containing carrier gas with the mixture entering the reaction zone temporarily separated from the reducing gas by the shielding gas.

5. The method of claim 1 where the reaction zone is purged with an inert gas prior to introducing the gaseous reactants to the reaction zone.

6. The method of claim 1 wherein said first gaseous reactant mixture of uranium hexafluoride and an oxygen-containing carrier gas is introduced into the reaction zone as a plurality of individual streams and the streams are surrounded by said shielding gas.

7. The method of claim 1 where the reducing gas is hydrogen, the oxygen-containing carrier gas is oxygen and the shielding gas is nitrogen.

8. The method of claim 1 where the reducing gas is dissociated ammonia, the oxygen-containing carrier gas is oxygen and the shielding gas is nitrogen.

9. The method of claim 1 where the reducing gas is hydrogen, the oxygen-containing carrier gas is air and the shielding gas is air.

10. The method of claim 1 where the reducing gas is dissociated ammonia, the oxygen-containing carrier gas is air and the shielding gas is air.

11. The method of claim 1 where the reducing gas is hydrogen, the oxygen-containing carrier gas is oxygen and the shielding gas is air.

12. The method of claim 1 where the reducing gas is dissociated ammonia, the oxygen-containing carrier gas is oxygen and the shielding gas is air.

13. The method of claim 1 where the reducing gas is hydrogen, the oxygen-containing carrier gas is air and the shielding gas is nitrogen.

14. The method of claim 1 where the reducing gas is dissociated ammonia, the oxygen-containing carrier gas is air and the shielding gas is nitrogen.

15. The method of claim 1 where the reducing gas is a mixture of hydrogen and dissociated ammonia, the oxygen-containing carrier gas is a mixture of oxygen and air and the shielding gas is a mixture of nitrogen and air.

16. The method of claim 1 where the shielding gas is an inert gas.

17. The method of claim 1 where the molar ratio of the reducing gas to uranium hexafluoride is at least about 4.0 and the molar ratio of oxygen to uranium hexafluoride is at least about 1.2.

18. The method of claim 1 where the reaction occurs in a flame at a temperature of at least about 750° C.

19. The method of claim 1 in combination with the initial step of preheating the reaction zone to an initial temperature of at least about 100° C.

20. The method of claim 1 where the reaction zone is maintained under a vacuum of about 1 to about 25 inches of mercury to draw the reaction products from the reaction zone.

21. The method of claim 1 where the gas stream withdrawn from the reaction zone is treated to collect hydrogen fluoride and water vapor from the gas stream in the form of hydrofluoric acid.

22. The product prepared from the process of claim 1.

23. A method of converting uranium hexafluoride to a uranium dioxide rich powder by a continuous flame reaction comprising the steps of:
(a) introducing a reducing gas into a reaction zone initially heated to a temperature of at least about 100° C. and maintained under a vacuum of about 1 to about 25 inches of mercury,
(b) operating an ignition means in said reaction zone,
(c) introducing a shielding gas into the reaction zone,
(d) introducing an oxygen-containing carrier gas so that it is surrounded by the shielding gas upon entering the reaction zone,
(e) introducing a flow of uranium hexafluoride so that it is mixed with the oxygen-containing carrier gas and surrounded by the shielding gas upon entering the reaction zone giving a reaction flame maintained out of contact with any solid structural surface defining said reaction zone, and
(f) collecting the uranium dioxide rich powder produced in the reaction zone.

24. The method of claim 23 where multiple adjacent flows of the mixture comprising uranium hexafluoride and the oxygen-containing carrier gas are introduced into said reaction zone and each of said multiple flows is surrounded by the shielding gas giving a reaction flame removed from contact with any solid structural surface defining in said reaction zone.

25. A method of converting uranium hexafluoride to a uranium dioxide rich powder by a continuous flame reaction comprising the steps of:
(a) introducing an oxygen-containing carrier gas into a reaction zone initially heated to a temperature of at least about 100° C. and maintained under a vacuum of about 1 to about 25 inches of mercury,
(b) operating an ignition means in said reaction zone,
(c) introducing a shielding gas into the reaction zone so that the shielding gas surrounds the oxygen-containing carrier gas upon entering the reaction zone,
(d) introducing a reducing gas into the reaction zone,
(e) introducing a flow of uranium hexafluoride so that it is mixed with the oxygen-containing carrier gas and surrounded by the shielding gas upon entering the reaction zone giving a reaction flame removed from contact with any solid structural surface defining said reaction zone, and
(f) collecting the uranium dioxide rich powder produced in the reaction zone.

26. The method of claim 25 where multiple adjacent flows of the mixture of uranium hexafluoride and the oxygen-containing carrier gas are introduced into said reaction zone and each of said multiple flows is surrounded by the shielding gas giving a reaction flame removed from contact with any solid structural surface in said reaction zone.

References Cited
UNITED STATES PATENTS

| | | | |
|---|---|---|---|
| 3,365,274 | 1/1968 | Carpenter et al. | 23—202 |
| 3,382,042 | 5/1968 | Richardson et al. | 23—202 |
| 3,260,575 | 7/1966 | Heestand et al. | 23—355 |
| 3,477,830 | 11/1969 | Hackstein et al. | 23—355 |

FOREIGN PATENTS 10,095   5/1966   Japan.

CARL D. QUARFORTH, Primary Examiner

R. L. TATE, Assistant Examiner

U.S. Cl. X.R.

423—261

UNITED STATES PATENT OFFICE
CERTIFICATE OF CORRECTION

Patent No. 3,796,672        Dated  12 March 1974

Inventor(s)  A. G. Dada/W. R. DeHollander

It is certified that error appears in the above-identified patent and that said Letters Patent are hereby corrected as shown below:

Column 3, line 44, "mixtures" should be --mixture--. Column 4, line 65, "6" should be --(6)--. Column 5, line 23, delete "ts". Column 6, line 18, after "inches" delete the period and insert a comma; line 66, "tube" should be --tubes--; and line 72, after "gas" delete the period and insert a comma. Column 7, line 40, after "products" delete the comma; and line 75, before "diameter" insert --a--. Column 8, line 72, omit "of". Table 3, Example 18, Under the heading "Shielding gas" there should appear "$N_2$". Table 5, The heading "Ex." should be --example--. Claim 24, line 7, omit "in". Claim 26, line 2, replace the second occurrence of "of" with --comprising--; and line 6, replace "in" with --defining--.

Signed and sealed this 5th day of November 1974.

(SEAL)
Attest:

McCOY M. GIBSON JR.
Attesting Officer

C. MARSHALL DANN
Commissioner of Patents